United States Patent
Klangos

(10) Patent No.: US 8,872,056 B2
(45) Date of Patent: Oct. 28, 2014

(54) METHOD FOR WELD REMOVAL, CUTTING, AND GOUGING WITH VACUUM REMOVAL OF BYPRODUCTS

(71) Applicant: Charles Klangos, Lowell, MA (US)

(72) Inventor: Charles Klangos, Lowell, MA (US)

(*) Notice: Subject to any disclaimer, the term of this patent is extended or adjusted under 35 U.S.C. 154(b) by 0 days.

(21) Appl. No.: 14/059,648

(22) Filed: Oct. 22, 2013

(65) Prior Publication Data

US 2014/0042141 A1 Feb. 13, 2014

Related U.S. Application Data

(63) Continuation of application No. 12/468,665, filed on May 19, 2009, now Pat. No. 8,592,710.

(60) Provisional application No. 61/054,375, filed on May 19, 2008.

(51) Int. Cl.
| | |
|---|---|
| *B23K 9/00* | (2006.01) |
| *B23K 35/38* | (2006.01) |
| *B23K 9/04* | (2006.01) |
| *B23K 15/00* | (2006.01) |
| *B23K 26/00* | (2014.01) |
| *B23K 9/32* | (2006.01) |
| *B23K 9/167* | (2006.01) |

(52) U.S. Cl.
CPC ............... *B23K 9/321* (2013.01); *B23K 9/167* (2013.01); *B23K 9/325* (2013.01)
USPC ............ 219/75; 219/74; 219/70; 219/137.41; 219/69.1; 219/121.48; 219/121.11; 219/121.56; 219/76.1; 219/121.46; 219/121.47; 219/137.63; 219/127

(58) Field of Classification Search
USPC .................................. 219/75, 70, 74, 137.41
See application file for complete search history.

(56) References Cited

U.S. PATENT DOCUMENTS

| | | | |
|---|---|---|---|
| 2,706,236 A | 4/1955 | Stepath et al. | |
| 2,768,278 A | 10/1956 | Gaines | |

(Continued)

FOREIGN PATENT DOCUMENTS

| | | |
|---|---|---|
| GB | 1393561 | 5/1975 |
| JP | 7116851 | 5/1995 |

(Continued)

OTHER PUBLICATIONS

Nippon Steel Corp / Hiramoto Y; Mori K, Submerged Nozzle for molten steel continuous casting installation sets ratio of bottom ejection opening cross-section and total cross-section of side and bottom openings within specific range, Abstract, Nov. 5, 2003, 2 pages, Thomson Reuters, Japan.

*Primary Examiner* — Dana Ross
*Assistant Examiner* — Gyounghyun Bae
(74) *Attorney, Agent, or Firm* — O'Connell Law Firm; Thomas P. O'Connell

(57) ABSTRACT

A method for metalworking using an adjustable vacuum and support system for evacuating particulate matter, smoke, excess gas, and molten metal from a work area during welding and for providing adjustable support to a welding head. The vacuum system has a vacuum head and a vacuum nozzle. An adjustable mounting bracket has a first portion fixed to the vacuum head and a second portion securable to the welding head. The bracket arrangement establishes pivotal and slidable couplings between the welding head and the vacuum head. The vacuum nozzle has a support surface for being rested on a surface of a workpiece to support the vacuum head and the welding head. The support surface can be a base bevel surface at the tip of the nozzle, and an opposed suction bevel surface can have a nozzle aperture interposed therealong.

22 Claims, 5 Drawing Sheets

(56) References Cited

U.S. PATENT DOCUMENTS

| | | | |
|---|---|---|---|
| 2,821,615 A * | 1/1958 | Fannon | 219/69.1 |
| 2,867,713 A * | 1/1959 | Muller | 219/69.1 |
| 3,213,261 A * | 10/1965 | Anderson | 219/127 |
| 3,309,564 A * | 3/1967 | Poulsen | 315/111.21 |
| 3,324,277 A | 6/1967 | Herring | |
| 3,524,038 A | 8/1970 | O'Kelly, Jr. | |
| 3,775,587 A | 11/1973 | Lindkvist | |
| 3,798,409 A | 3/1974 | Troyer et al. | |
| 3,872,279 A * | 3/1975 | Fairbairn | 219/121.47 |
| 3,891,824 A * | 6/1975 | Essers et al. | 219/121.46 |
| 3,947,653 A * | 3/1976 | Fairbairn | 219/76.1 |
| 3,958,096 A * | 5/1976 | Schweikhardt | 219/75 |
| 3,980,860 A | 9/1976 | Howell et al. | |
| 4,154,999 A | 5/1979 | Pinfold et al. | |
| 4,179,059 A | 12/1979 | Chang et al. | |
| 4,338,507 A | 7/1982 | Scott | |
| 4,388,514 A | 6/1983 | Coughlin et al. | |
| 4,493,970 A | 1/1985 | Rieppel et al. | |
| 4,527,037 A * | 7/1985 | Johnson et al. | 219/69.1 |
| 4,531,039 A | 7/1985 | Okano et al. | |
| 4,767,907 A * | 8/1988 | Otani et al. | 219/121.56 |
| 4,797,528 A | 1/1989 | Moore et al. | |
| 5,015,822 A | 5/1991 | Mann | |
| 5,079,404 A | 1/1992 | Zamuner | |
| 5,182,435 A | 1/1993 | Wang | |
| 5,378,870 A * | 1/1995 | Krupnicki | 219/137.63 |
| 5,491,321 A | 2/1996 | Stuart et al. | |
| 5,793,009 A * | 8/1998 | Offer | 219/75 |
| 5,958,261 A * | 9/1999 | Offer et al. | 219/75 |
| 5,981,897 A * | 11/1999 | Offer et al. | 219/75 |
| 6,332,837 B1 | 12/2001 | Wilk et al. | |
| 6,610,958 B2 | 8/2003 | Stricklen | |
| 6,888,097 B2 | 5/2005 | Batarseh | |
| 7,180,028 B2 | 2/2007 | Flood et al. | |
| 2008/0083333 A1 | 4/2008 | Yokoi et al. | |

FOREIGN PATENT DOCUMENTS

| | | |
|---|---|---|
| JP | 08112684 | 5/1996 |
| JP | 09267178 | 10/1997 |
| JP | 2000052041 | 2/2000 |
| JP | 2000288011 | 10/2000 |
| JP | 2003311381 | 11/2003 |

* cited by examiner

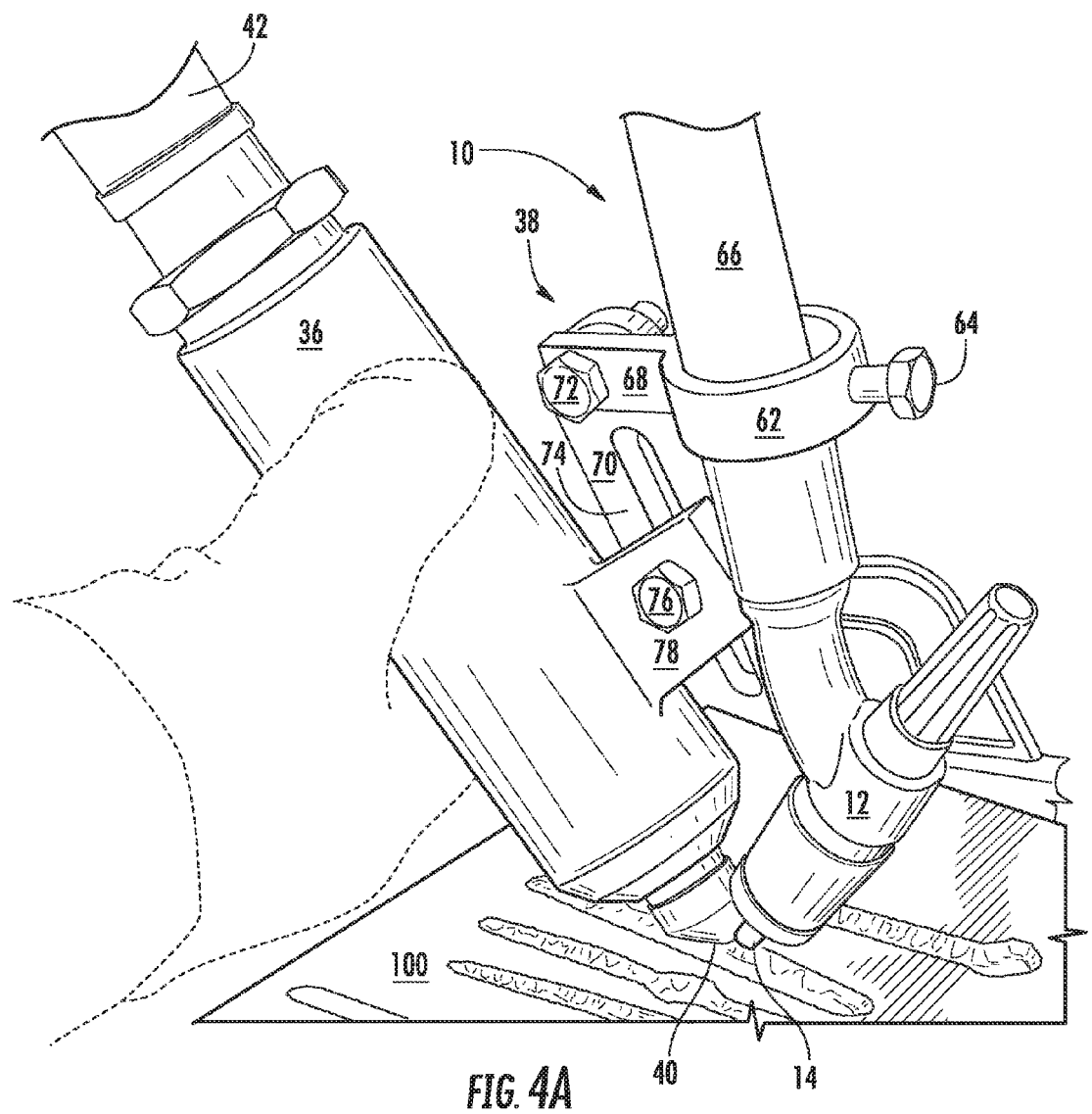

METHOD FOR WELD REMOVAL, CUTTING, AND GOUGING WITH VACUUM REMOVAL OF BYPRODUCTS

FIELD OF THE INVENTION

The present invention relates to welding systems and methods. More particularly, disclosed and protected herein are a system and method for weld removal and metal cutting and gouging with the application of a vacuum during operation of a welding apparatus to evacuate particulate matter, smoke, excess gasses, and molten metal from the work area.

BACKGROUND OF THE INVENTION

Tungsten inert gas (TIG) welding, which can alternatively be referred to as gas tungsten arc welding (GTAW), is an arc welding process wherein a nonconsumable electrode is employed for welding materials together, cutting, and gouging. The weld area is protected from atmospheric contamination by a shielding gas. The shielding gas is typically an inert gas, such as argon. The flow of the shielding gas must be sufficient and consistent to ensure that the gas covers the weld so that impurities in the atmosphere are blocked. A welding power supply produces the energy required for welding, which is conducted across the welding arc through a column of highly ionized gas and metal vapors, which is referred to as a plasma.

The electrode used in TIG welding is commonly made of tungsten or a tungsten alloy since tungsten has the highest melting temperature among pure metals, at 3,422° C. (6,192° F.). Electrodes can have either a clean finish or a ground finish. The diameter of the electrode can vary, such as between approximately 0.5 millimeter and 6.4 millimeters (0.02-0.25 in), and the length of the electrode can range from 75 to 610 millimeters (3-24 in).

Filler metals are used in nearly all TIG welding processes, except in the welding of thin materials. Filler metals can be disposed in rod form and are available with different diameters and are made of a variety of materials. The filler metal can be added to the weld pool manually. Alternatively, some applications employ an automatically fed filler metal, which often is stored on spools or coils.

TIG welding can be used in relation to thick and heavy pieces of metal and relative to light metals, such as aluminum, magnesium, and copper alloys, and thin pieces of stainless steel. TIG welding is advantageous in that the weld can typically be controlled with greater precision. Furthermore, the resulting welds typically demonstrate greater strength and higher quality than those deriving from other welding methods.

However, cutting, gouging, and weld removal using a TIG welding apparatus can be dangerous and can propagate smoke, fumes, and molten and particulate matter throughout the welding area. Flying sparks and droplets of molten metal can cause severe burns and present fire hazards. Additionally, shielding gases used by TIG welders can displace oxygen and lead to asphyxiation. Furthermore, short wavelength ultraviolet light produced by TIG welders can break down ambient air and form dangerous ozone. Still further, heavy welding metals can be taken into the lungs. Even further, poisonous fumes can be created as the heat from the welder vaporizes materials disposed on the work surface.

Prior art inventors have attempted to extract fumes from the welding area by various methods that have left serious needs with respect to the safety and comfort. For example, some welder's simply employ negative air pressure in the welding area as a whole, such as by use of exhaust fans and other methods. Another attempt to remove fumes from the welding area is disclosed in British Patent No. 1,393,561 to the Hobart Brothers Company. Under the teachings of the '561 patent, a fume passageway is incorporated directly within the inner shell of the handle of the welding head. Disadvantageously, the disclosed invention does not appear to enable any adjustment of the relative positions of the welding tip and the fume passageway whereby the effect of the fume passageway seems to be incapable of adjustment. Furthermore, the invention of the '561 patent fails to provide any support to the welding head during the welding process thereby leaving the operator responsible for attempting to maintain a desired distance and control of the welding head in relation to the workpiece.

In light of the foregoing, it will be appreciated that there remains a need for a system for use with a TIG welder during weld removal, cutting, and gouging that minimizes or eliminates the propagation of smoke, fumes, molten metal, particulate matter, and other harmful byproducts from the work area thereby to protect the welder, bystanders, and the surroundings.

SUMMARY OF THE INVENTION

Advantageously, the present invention is founded on the basic object of providing a system and method for use with a TIG welding apparatus that evacuates welding byproducts to prevent or limit the emission of the same from the work area.

A related object of embodiments of the invention is to provide a system and method for applying a vacuum during cutting, gouging, and weld removal with a TIG welding apparatus that enhances the safety of the welder and those in the work area.

Another object of the invention is to provide a system and method for applying a vacuum during cutting, gouging, and weld removal with a TIG welding apparatus that reduces the danger, damage, and spread of debris to the area surrounding the work area.

A further object of embodiments of the invention is to provide a system and method for applying a vacuum during cutting, gouging, and weld removal with a TIG welding apparatus that enables the collection and safe disposal of emitted matter.

Still another object of the invention is to provide a vacuum system and method that produces cuts, gouges, and weld removals that are clean, neat, and efficient and that require minimal grinding, smoothing, and other post-processing.

A further object of embodiments of the invention is to provide a vacuum system and method that enables an adjustment of the relative positions of the welding head and the vacuum head for optimal performance.

Another object of the embodiments of the invention is to provide a vacuum system and method that provides stable support to the welding head during welding procedures to reduce operator fatigue and to improve welding consistency.

One will appreciate that the foregoing broadly outlines certain goals of the invention to enable a better understanding of the detailed description that follows and to instill a better appreciation of the inventor's contribution to the art. These and further objects and advantages of embodiments of the invention will become obvious not only to one who reviews the present specification and drawings but also to one who has an opportunity to make use of an embodiment of a system for cutting, gouging, and weld removal with a TIG welding apparatus with the vacuum removal of molten metal, fumes, and other byproducts disclosed herein.

The accomplishment of each of the foregoing objects in a single embodiment of the invention may be possible and indeed preferred. However, it will be appreciated that not all embodiments will seek or need to accomplish each and every potential object and advantage. Nonetheless, all such embodiments should be considered within the scope of the present invention.

In carrying forth the foregoing objects, a basic embodiment of the present invention comprises a metalworking system that enables the application of a vacuum during operation of a TIG welding arrangement to evacuate particulate matter, smoke, excess gasses, and molten metal from a work area. The system has a tungsten inert gas (TIG) welding arrangement with a welding head, an electrode holder retained by the welding head, a nonconsumable tungsten electrode retained by the electrode holder for creating a welding arc, a welding power supply connected to the welding head, and an inert gas supply for providing shielding gas during a metalworking operation. A vacuum system with a vacuum head and a vacuum nozzle retained by the vacuum head is coupled to the welding head by a mounting bracket arrangement.

The mounting bracket arrangement can include a means for permitting an adjustment of a disposition of the welding head in relation to the vacuum head. More particularly, the distance between the tungsten electrode of the welding head and the vacuum nozzle of the vacuum system can be adjustable, such as by a pivotal connection, to enable optimal performance and operator comfort. In certain embodiments, the means for permitting an adjustment of the disposition of the welding head in relation to the vacuum head permits longitudinal and lateral adjustment of the welding head relative to the vacuum head.

A ring with a setscrew or other means of the mounting bracket arrangement can matingly engage the welding head to establish a relatively slidable coupling between the welding head and the vacuum head. Still further, a slidable connection can be established by further established by a link in the mounting bracket arrangement that can have a channel in combination with a fastener slidably engaged with the channel for selectively fixing the fastener in relation to the channel.

Even more particularly, the mounting bracket arrangement can have the support ring, a means for fixing the support ring relative to the welding head, a ring bracket that projects from the support ring, a link pivotally coupled to the ring bracket by a clamping fastener that can selectively lock the ring bracket in relation to the link, a vacuum head bracket that projects from the vacuum head, a channel that communicates longitudinally along the link, and a clamping fastener that passes through the vacuum head bracket and through the channel.

Under certain constructions of the invention, the vacuum nozzle can have a support surface for being rested on a surface of a workpiece so that the vacuum nozzle can provide support to the vacuum head and the welding head. Furthermore, the height of the tungsten electrode above the surface of the workpiece can be adjusted by use of the means for permitting an adjustment of a disposition of the welding head in relation to the vacuum head. To facilitate the evacuation of fumes and debris from the work area, the nozzle tip can have a base bevel surface disposed at an angle relative to a longitudinal axis of the vacuum nozzle that forms the support surface, an opposed suction bevel surface disposed at an angle opposed to the angle of the base bevel surface, and a nozzle aperture with at least a portion of the nozzle aperture interposed along the opposed suction bevel surface. The vacuum nozzle can be formed in potential embodiments of sapphire gemstone or a zirconium alloy for their preferred thermal performance characteristics.

A source of negative air pressure can be connected to the vacuum head by a conduit. Furthermore, a cooling and retention chamber can be interposed between the vacuum head and the source of negative air pressure for receiving particulate matter and other debris. The cooling and retention chamber can comprise a fluid-tight chamber for retaining a volume of cooling fluid, an inlet port connected to the vacuum head, an exhaust port connected to the source of negative pressure, and at least one baffle between the inlet port and the outlet port. To enable an adjustment of the vacuum force applied by the vacuum head, a vacuum control assembly with a pressure gauge and a control valve can be fluidically coupled to the conduit.

The invention can be further characterized as a method for metalworking with the application of a vacuum during operation of a welding arrangement to evacuate particulate matter, smoke, gas, and molten metal from a work area. The method is founded on providing a welding arrangement, such as tungsten inert gas (TIG) welding arrangement, with a welding head, an electrode holder retained by the welding head, an electrode retained by the electrode holder for creating a welding arc, and a welding power supply connected to the welding head. A vacuum system is provided with a vacuum head and a vacuum nozzle retained by the vacuum head. The vacuum nozzle has a support surface for being rested on a surface of a workpiece during weld removal, cutting, and gouging. An adjustable mounting bracket couples the welding head to the vacuum head and is adjustable to permit an adjustment of a disposition of the welding head in relation to the vacuum head and an adjustment of a distance between the electrode of the welding head and the vacuum nozzle of the vacuum system. The support surface of the vacuum nozzle can thus be disposed on the surface of the workpiece to cause the vacuum nozzle to provide support to the vacuum head and the welding head.

Under this configuration, cutting, gouging, and weld removal can be carried out by actuating the electrode of the welding arrangement while evacuating particulate matter, smoke, gas, and molten metal through the vacuum nozzle by actuating the vacuum system. Except as the invention might be expressly limited, the vacuum nozzle and welding head can be retained and advanced manually, such as in the hands of a user, or automatically.

Advantageously, the system permits a user to adjust the performance of the vacuum system, the welding head, and the overall metalworking system. For instance, a user can adjust the height and supported position of the electrode above the surface of the workpiece and the distance between the electrode and the vacuum nozzle by use of the adjustable mounting bracket.

The adjustable mounting bracket can again permit longitudinal and lateral adjustment of the welding head relative to the vacuum head. Moreover, the adjustable mounting bracket can establish a pivotal and relatively slidable coupling between the welding head and the vacuum head. A user exploiting those longitudinal, lateral, pivotal, and slidable adjustments can optimize the performance of the vacuum nozzle, the welding head, and the combination of their effects in performing metalworking processes with the efficient removal of gas, particulate matter, debris, and molten metal.

The vacuum nozzle can again have a tip with a base bevel surface disposed at an angle relative to a longitudinal axis of the vacuum nozzle that forms the support surface and a suction bevel surface disposed at an angle opposed to the angle of the base bevel surface. With that, the the suction bevel surface will be upturned from the support surface and the work surface. A nozzle aperture can have at least a portion thereof interposed along the suction bevel surface.

One will appreciate that the foregoing discussion broadly outlines the more important features of the invention to enable a better understanding of the detailed description that follows and to instill a better appreciation of the inventor's contribution to the art. Before any particular embodiment or aspect thereof is explained in detail, it must be made clear that the following details of construction and illustrations of inventive concepts are mere examples of the many possible manifestations of the invention.

BRIEF DESCRIPTION OF THE DRAWINGS

The invention may be more completely understood with reference to the accompanying drawings, in which:

FIG. 4A is a perspective view of a welding head with a vacuum nozzle pursuant to the present invention;

DETAILED DESCRIPTION OF PREFERRED EMBODIMENTS

It will be appreciated that the present invention for a system and method for cutting, gouging, and weld removal with a TIG welding apparatus with the vacuum removal of molten metal, fumes, and other byproducts disclosed herein is subject to widely varied embodiments. However, to ensure that one skilled in the art will be able to understand and, in appropriate cases, practice the present invention, certain preferred embodiments of the broader invention revealed herein are described below and shown in the accompanying drawing figures. Before any particular embodiment of the invention is explained in detail, it must be made clear that the following details of construction, descriptions of geometry, and illustrations of inventive concepts are mere examples of the many possible manifestations of the invention.

Figure 1:
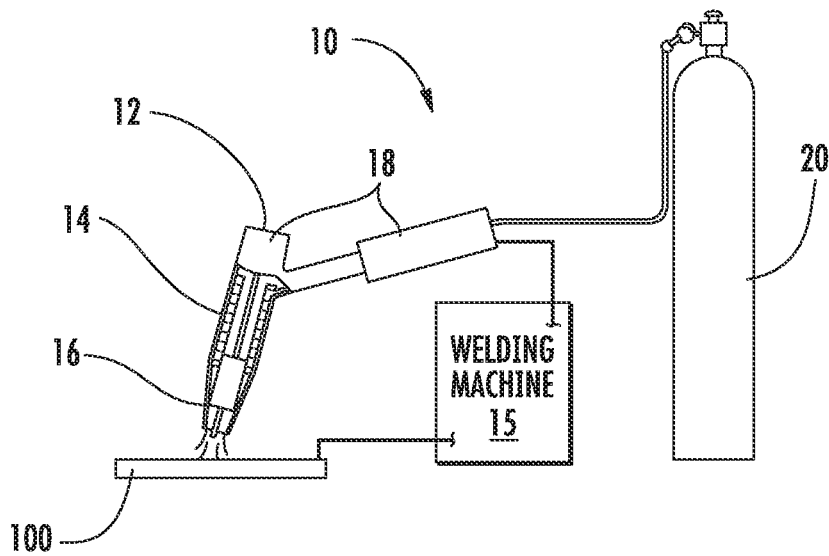
FIG. 1 is a view in side elevation of a TIG welding apparatus according to the prior art.
Figure 2:
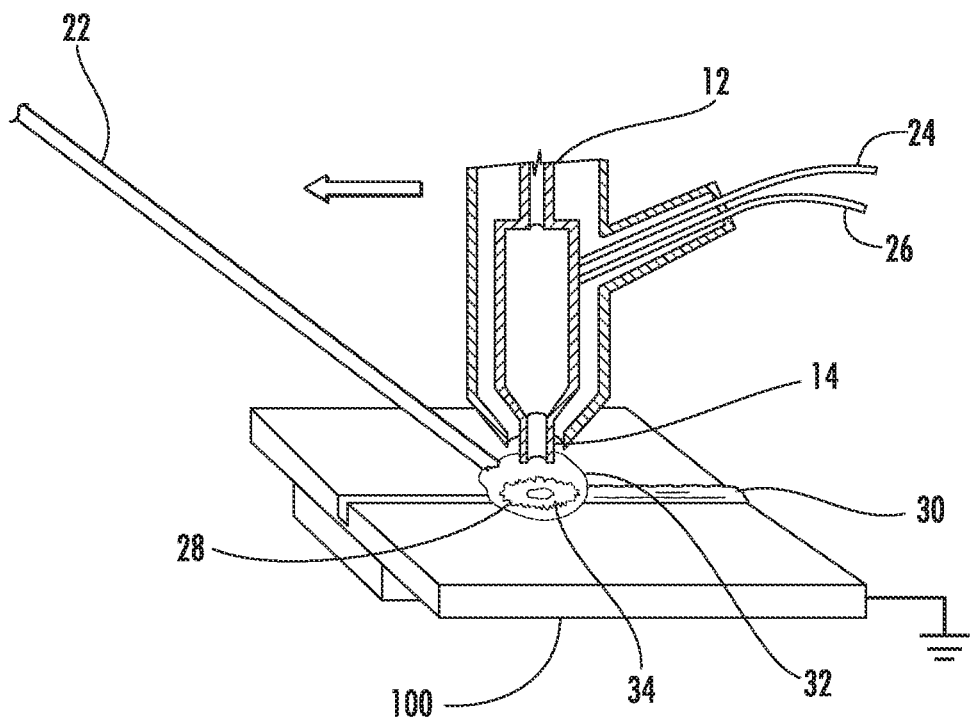
FIG. 2 is a partially sectioned perspective view of a prior art TIG welding apparatus.

A conventional TIG welding arrangement is indicated generally at 10 in FIG. 1, and FIG. 2 depicts a prior art TIG welding head 12 in operation. The welding head 12 employs a nonconsumable tungsten electrode 14 that is retained by an electrode holder 18. The welding head 12 receives power from a welding power supply 24. Shielding gas 32 is provided by an inert gas supply 20 through a shielding gas supply hose 26. The welding power supply 24 is typically a constant current power source, meaning that the current and thus the heat remain relatively constant, even if the arc distance and voltage change.

In direct current TIG welding with a negatively charged electrode (DCEN), a negatively charged electrode generates heat by emitting electrons. The electrons travel across the arc to cause thermal ionization of the shielding gas thereby yielding an increase in the temperature of the base material. In direct current TIG welding with a positively charged electrode (DCEP), which is not as common, electrons flow oppositely thereby causing the electrode to reach very high temperatures. As the electrons flow toward the electrode, ionized shielding gas flows back toward the base material thereby improving the quality and appearance of the weld by removing oxides and other impurities.

The shielding gas supplied by the shielding gas supply hose 26 is dispensed through gas passages 16 in the welding head 12 to protect the welding area from atmospheric gases, such as nitrogen and oxygen. Otherwise, such gases can cause fusion defects, porosity, and weld metal embrittlement when they make contact with the electrode 14, the arc 28, or the welding metal whether it be the filler rod 22 or the workpiece 100. Shielding gas also contributes to maintaining a stable arc 28 and aids in the transfer of heat from the electrode 14 to the metal of the filler rod 22 and the workpiece 100.

The welding arc 28 is initiated by a high frequency generator 15 that provides a path for the welding current through the shielding gas when the separation between the electrode 14 and the workpiece 100 is within a given range of distance, such as approximately 1.5-3 mm (0.06-0.12 in). Alternatively, the electrode 14 and the workpiece 100 can be brought into contact to initiate what is referred to as a touch or scratch start of the arc 28.

With an arc 28 initiated, the welder typically creates a weld pool 34 by moving the welding head 12 in a small circle. The welding head 12 is then normally tilted to a given angle away from vertical. During each of the processes of welding, weld removal, cutting, and gouging, the welder then attempts to maintain a constant separation between the workpiece 100 and the electrode 14. During welding, filler metal, such as from the filler rod 22, is added as necessary to maintain the weld pool 34 as the welding head 12 leaves a weld bead 30 in its trail. However, during weld removal, cutting, and gouging, material is only removed. Filler metal need not be added.

As noted above, TIG welding employing the prior art welding arrangements 10 depicted in FIGS. 1 and 2 is advantageous for a plurality of reasons including the strength and quality of the resulting welds. However, during the processes of cutting, gouging, and weld removal, TIG welding methods and systems of the prior art suffer from a plurality of disadvantages as previously summarized. For example, they present dangers to the welder, bystanders, and the surroundings resulting from the propagation of smoke, debris, molten metal, fumes, and other welding byproducts.

The present invention advantageously solves these and further deficiencies by providing a specialized system and method for cutting, gouging, and weld removal using a TIG welding apparatus wherein molten metal, fumes, and other byproducts are removed by the application of a vacuum. An exemplary embodiment of the current invention for a system for the vacuum removal of byproducts during cutting, gouging, and weld removal relative to a TIG welding system is indicated generally at 10 in FIG. 3.

Figure 3:
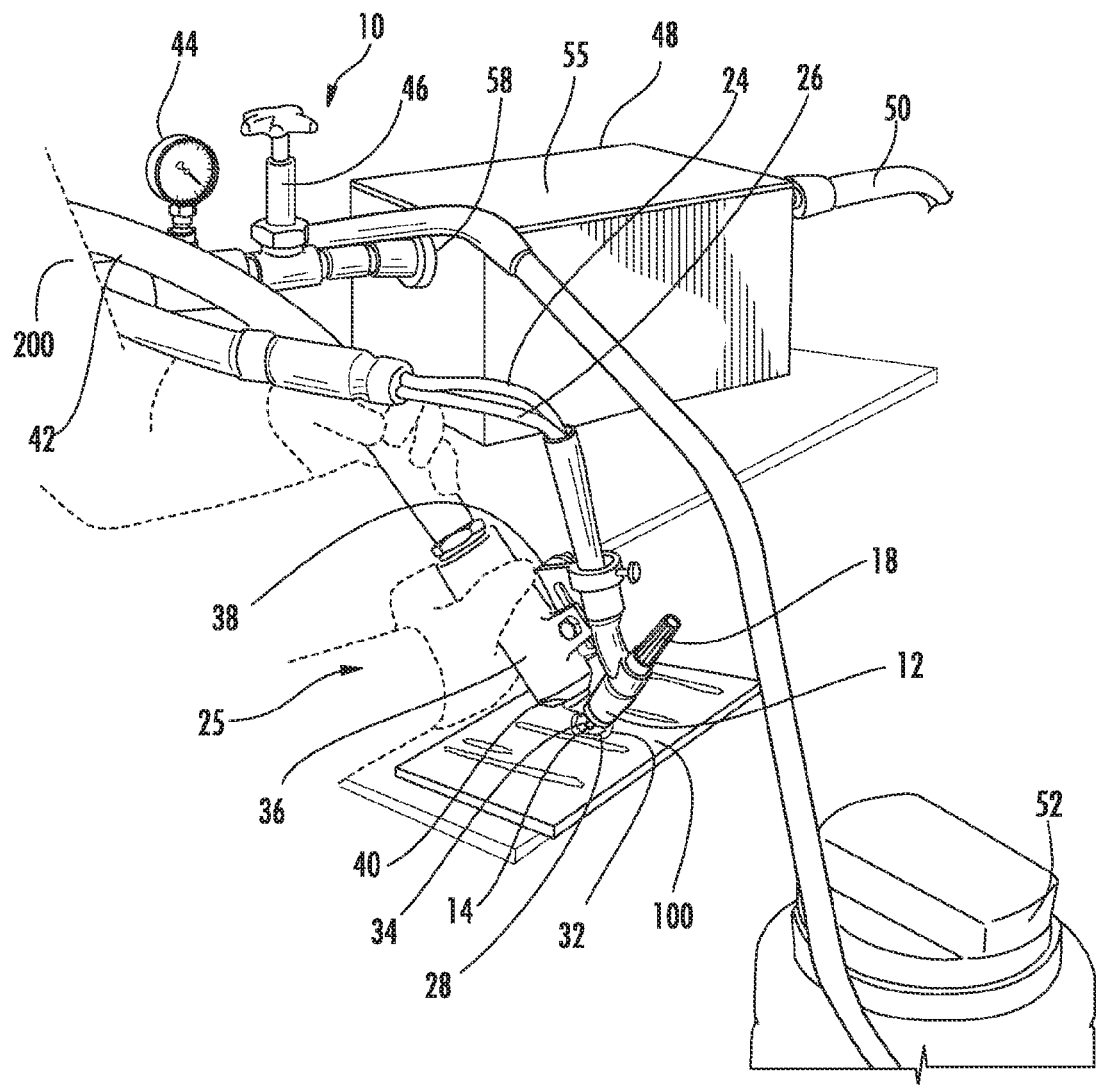
FIG. 3 is a perspective view of a vacuum system for use with a TIG welding apparatus during cutting, gouging, and weld removal as disclosed herein.

As shown in FIG. 3, the system 10 is founded on a welding head 12 and an adjustable vacuum and support system 25, which may alternatively be referred to as a vacuum system 25, with a vacuum head 36. The adjustable vacuum and support system 25 has a longitudinally and laterally adjustable bracket arrangement 38 that retains and supports the welding head 12. As will be described further hereinbelow, through the longitudinal and lateral adjustability, the bracket arrangement 38 acts as a means for enabling an adjustment of the relative orientations and positions of welding head 12 and the vacuum head 36 and an adjustment of the supported position of the welding head 12 relative to the workpiece 100.

The welding head 12 can be substantially according to the prior art with a tungsten electrode 14 retained by an electrode holder 18. Indeed, in certain practices of the invention, the adjustable vacuum and support system 25 can be retrofitted to a prior art welding head 12 to enable the use thereof according to the present invention. Alternatively, the welding head 12 and the vacuum and support system 25 can be integrated on initial manufacture or otherwise for use under the present invention. A power supply 24 enables the creation of a welding arc 28, which is used under the present invention for weld removal, cutting, and gouging. As with prior art welding heads 12, a shielding gas supply hose 26 supplies shielding gas 32 for protecting a weld pool 34.

Figure 4B:
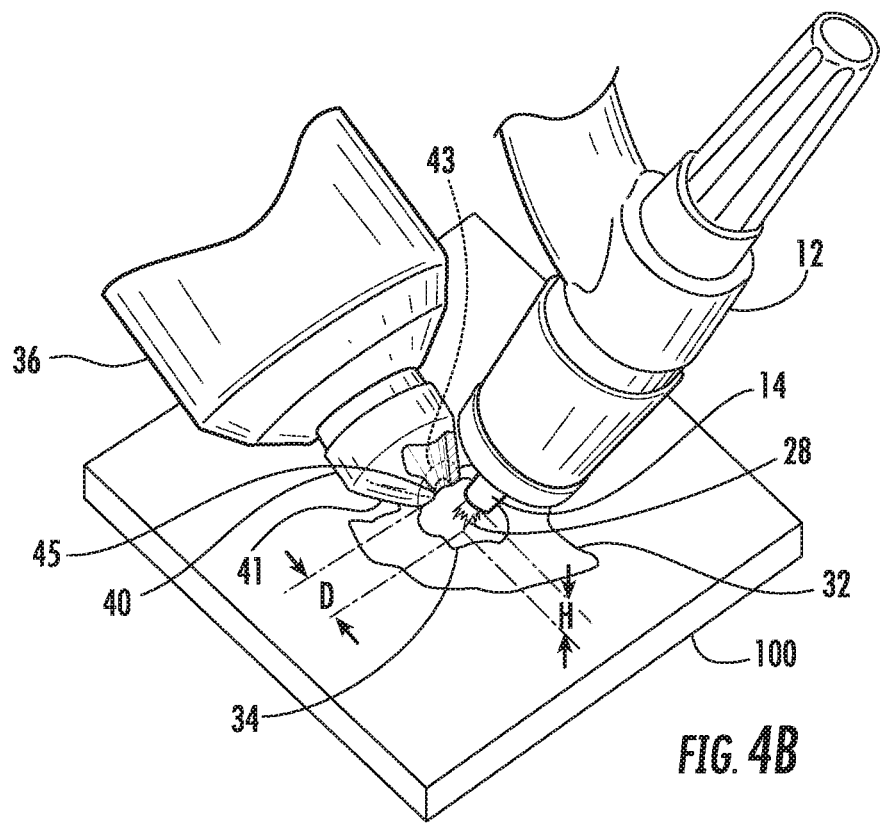
FIG. 4B is a partially sectioned close-up perspective view of the welding head and vacuum nozzle of FIG. 4B.

As shown in FIGS. 3, 4A, and 4B, the welding head 12 is coupled by the mounting bracket arrangement 38 to the vacuum head 36, which has a vacuum nozzle 40. The mounting bracket arrangement 38 is adjustable to enable a selective adjustment of the distance and orientation of the vacuum nozzle 40 in relation to the welding head 12 in general and the tungsten electrode 14 in particular. Furthermore, where the tip of the vacuum nozzle 40 is placed in a supportive position on the surface of the workpiece 100, the mounting bracket arrangement 38 additionally permits an adjustment of the height of the electrode 14 above the workpiece 100.

A source of negative pressure, in this case a vacuum 52, provides a suction force to the vacuum nozzle 40 through an inlet vacuum conduit 42, a cooling and retention chamber 48, and an outlet vacuum conduit 50, which are in fluidic communication with one another. With this, byproducts of the cutting, gouging, and weld removal processes, including smoke, fumes, and particulate matter, can be evacuated to prevent the propagation of the same throughout the work area.

A vacuum control assembly is operably associated with the inlet vacuum conduit 42, such as by being interposed therealong, to enable a control over the vacuum pressure applied at the vacuum nozzle 40. In the present embodiment, the vacuum control assembly comprises a pressure gauge 44 in combination with a control valve 46 as are depicted in FIG. 3. So arranged, the vacuum control assembly can be employed in cooperation with the adjustability provided by the mounting bracket arrangement 38 to ensure that sufficient vacuum force is applied to prevent or minimize the propagation of byproducts from cutting, gouging, and weld removal throughout the work area while ensuring that not so much vacuum force is applied as to impair the protective function of the shielding gas 32.

In one presently contemplated embodiment, the vacuum head 36 can be founded on a metal cylinder, which can be crafted from an aluminum alloy. The cylinder can have a length of approximately ten inches, an outer diameter of 1.5 inches, and an inner diameter of approximately ⅞ inches. The vacuum nozzle 40 can have a length of approximately 2 inches and a diameter of approximately ¼ inches. The nozzle 40 can have a distal end cut to first and second opposed bevel angles to form a downwardly-turned base bevel surface 41 and an upwardly-turned suction bevel surface 43. A nozzle aperture 45 has at least a portion thereof interposed along the upwardly-turned suction bevel surface 43 and a portion thereof interposed along the downwardly-turned base bevel surface 41 to facilitate the efficient intake of the byproducts of weld removal, cutting, and gouging. Under this arrangement, the welding arrangement 10 can be employed in cutting, gouging, and weld removal with the base bevel surface 41 resting on the surface of the workpiece 100 as shown in FIGS. 3, 4A, and 4B. As such, the base bevel surface 41 provides support to the welding head 12 and the adjustable vacuum and support system 25 thereby reducing operator fatigue, improving control over the disposition of the welding head 12 relative to the work surface 100, and, as a result, improving the quality of the welding process.

To prevent clogging, the nozzle 40 and the inner annular wall thereof can taper toward the distal end of the nozzle 40. For example, the nozzle 40 can taper from a proximal outer diameter of approximately ⁷⁄₁₆ inches to an outer diameter at its distal tip of approximately ⅜ inches. The vacuum nozzle 40 can be formed integrally with or separately from the vacuum head 36 and can be formed from any suitable material or combination thereof. In certain embodiments, the vacuum nozzle 40 can be crafted from a high-melting point aluminum alloy. In other embodiments, the vacuum nozzle 40 can be formed from a precious or semi-precious gemstone for improved performance and durability. For example, in one contemplated embodiment, the vacuum nozzle 40 can be crafted from sapphire gemstone, which may be considered particularly advantageous in carrying forth the invention. In other embodiments, the vacuum nozzle 40 can be formed from a zirconium alloy for its excellent resistance to heat and other advantageous properties. Such a vacuum nozzle 40 can have an outer diameter of approximately ⅞ inches with a ⅝ inch aperture.

The vacuum conduit 42 could pursue any effective configuration. In certain constructions, the vacuum conduit 42 can comprise a stainless steel braided hose with a first, distal end coupled to the vacuum head 36 and a second, proximal end fluidically coupled to the cooling and retention chamber 48 with the vacuum control assembly interposed therebetween. The vacuum control assembly can be fluidically coupled to the cooling and retention chamber 48 at an inlet coupling 58. The dimensional characteristics of the vacuum conduit 42 can vary depending on the circumstances. In one embodiment, for example, the conduit 42 can have a 1-inch diameter and a length of approximately 3 feet.

The cooling and retention chamber 48 can comprise a rigid box of metal or other suitable material. In certain embodiments, the chamber 48 can be formed with walls of ⅛ inch thick sheet metal with a length of approximately two feet and a height and width of approximately 1 foot. The chamber 48 can have a removable lid 55 for enabling access to the inner volume thereof. An outlet vacuum conduit 50 has a first end fluidically coupled to the chamber 48 at an outlet coupling 60 and a second end fluidically coupled to the vacuum source 52 of FIG. 3.

Figure 5:
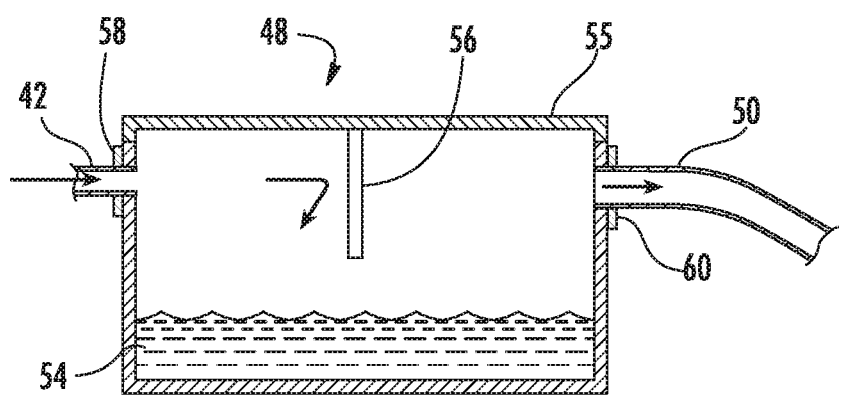
FIG. 5 is a cross-sectional view of a cooling and retention chamber of a vacuum system for use with a TIG welding apparatus as disclosed herein.

The cooling and retention chamber 48, which is depicted in cross section in FIG. 5, retains a volume of cooling fluid 54. One or more downwardly depending baffles 56 can be fixed to the removable lid 55 and interposed within the open inner volume of the retention chamber 48 between the inlet vacuum conduit 42 and the outlet vacuum conduit 50. Under this arrangement, particulate matter and molten metal drawn from the area through the vacuum nozzle 40 is drawn through the inlet vacuum conduit 42 and into the cooling and retention chamber 48. Once in the retention chamber 48, the particulate matter either falls immediately into the cooling fluid 54 for any necessary cooling or, if possessing sufficient velocity, strikes the baffle 56 and then falls into the cooling fluid 54 where it is cooled and retained for later disposal. When necessary, the lid 55 can be removed from the chamber 48 to clear accumulated material, to clean the inner surfaces of the chamber 48, or otherwise to maintain the chamber 48.

Figure 6:
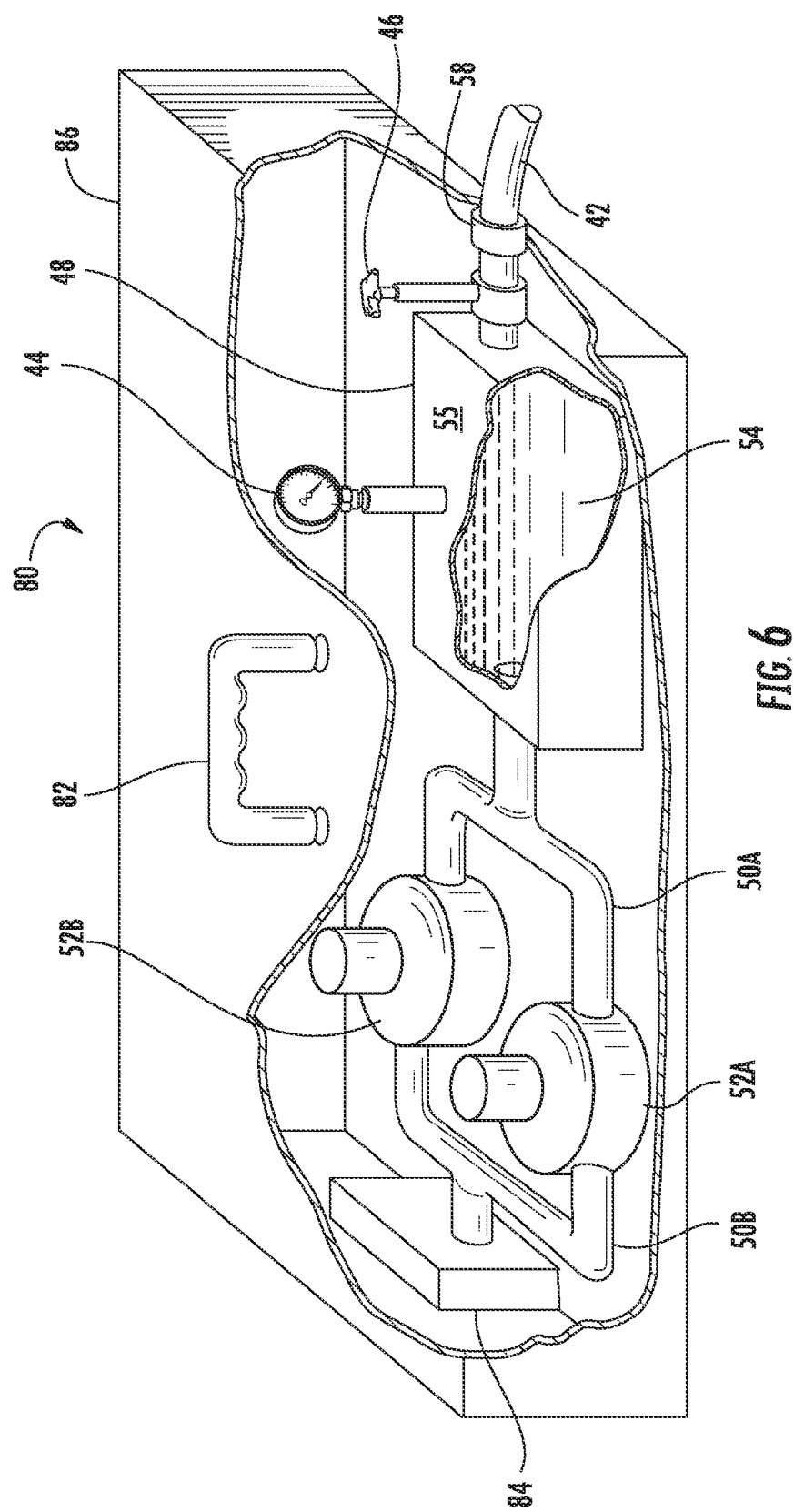
FIG. 6 is a partially sectioned perspective view of a portable unit housing a cooling and retention chamber, vacuum motors, and other components under the present invention.

Embodiments of the invention are also contemplated where many of the components are integrated into a unitary, portable unit as shown at 80 in FIG. 6. There, a housing 86, which comprises a rigid box with an open inner volume, houses the cooling and retention chamber 48, which again has a removable lid 55. The inlet vacuum conduit 42 can be coupled to the inlet coupling port 58. Pressure in the cooling and retention chamber 48 and the system in general can be monitored by a gauge 44 and controlled by a valve 46. A first outlet vacuum conduit 50A has a proximal end coupled to the cooling and retention chamber 48 and first and second branches fluidically coupled to first and second vacuum motors 52A and 52B. A second outlet vacuum conduit 50B has first and second branches fluidically coupled to the first and second vacuum motors 52A and 52B and a distal end fluidically coupled to a filtration unit 84, which can include a chromium filter, for cleansing air received from the vacuum motors 52A and 52B. A handle 82 is fixed to the housing 86 for enabling lifting and carrying of the portable unit 80. With this, the portable unit 80 can be connected to a vacuum head 36 as disclosed herein, and the vacuum head 36 can in turn be coupled to a welding head 12 for removing smoke, fumes, and debris as disclosed herein in a readily portable format.

To make use of the system for cutting, gouging, and weld removal with a TIG welding apparatus 10, the welder 200 can position and align the welding head 12 in relation to the vacuum head 36 and the position that the welding head 12 is retained relative to the workpiece 100 by manipulation of the bracket arrangement 38. As shown in FIG. 4A where the vacuum head 36 and the bracket arrangement 38 forming the adjustable vacuum and support system 25 support a welding head 12 typical of the prior art, the bracket arrangement 38 includes a support ring 62 that can matingly receive the handle portion 66 of the welding head 12. A setscrew 64 can lock the support ring 62 at a desired location along the handle portion 66. A ring bracket 68 projects radially from the support ring 62, and a link 70 is pivotally coupled to the ring bracket 68 by a clamping fastener 72 that can selectively lock the ring bracket 68 in relation to the link 70. A vacuum head bracket 78 projects radially from the vacuum head 36. The link 70 has a channel 74 that communicates longitudinally therealong, and a clamping fastener 76 passes through the vacuum head bracket 78 and through the channel 74. With this, the vacuum head bracket 78 can be selectively locked in angular and longitudinal positions relative to the link 70.

So configured, the bracket arrangement 38 can be exploited to adjust the relative orientations and positions of welding head 12 and the vacuum head 36 and to adjust the supported position of the welding head 12 relative to the workpiece 100. The longitudinal position of the support ring 62 and the angular relationships and longitudinal positions of the brackets 68 and 78 and the link 70 can all be adjusted for optimal performance of the welding arrangement 10. By way of example, the distance D between the nozzle aperture 45 and the arc 28 can be adjusted to optimize the vacuuming effect in the removal of smoke and debris. Furthermore, the height H at which the electrode 14 is supported relative to the surface of the workpiece 100 as the vacuum nozzle 40 is stably supported by the workpiece 100 can be adjusted for optimal cutting, gouging, weld removal, or other operations. Furthermore, the relative positions of the vacuum head 36 and the welding head 12 can be adjusted for the comfort of the welder 200 and based on the characteristics of, for example, the welding head 12 and the welding operation.

With the vacuum head 36 and the welding head 12 positioned as desired, the vacuum 52 can then be activated and the TIG torch welding head 12 can be ignited. These activations can be independent or interdependent. The welding head 12 and vacuum head 36 can then be positioned in relation to the workpiece 100 to enable weld removal, cutting, or gouging. As the process is carried out, the vacuum nozzle 40 forcibly draws the molten metal, gases, and particulate matter from the work area thereby preventing the contamination of the surrounding area and minimizing dangers to the welder 200, bystanders, and the surroundings.

With certain details of the present invention for a system and method for use with a welding apparatus and method disclosed, it will be appreciated by one skilled in the art that changes and additions could be made thereto without deviating from the spirit or scope of the invention. This is particularly true when one bears in mind that the presently preferred embodiments merely exemplify the broader invention revealed herein. Accordingly, it will be clear that those with certain major features of the invention in mind could craft embodiments that incorporate those major features while not incorporating all of the features included in the preferred embodiments.

Therefore, the following claims are intended to define the scope of protection to be afforded to the inventor. Those claims shall be deemed to include equivalent constructions insofar as they do not depart from the spirit and scope of the invention. It must be further noted that a plurality of the following claims may express certain elements as means for performing a specific function, at times without the recital of structure or material. As the law demands, these claims shall be construed to cover not only the corresponding structure and material expressly described in this specification but also all equivalents thereof that might be now known or hereafter discovered.

I claim as deserving the protection of Letters Patent:

1. A method for metalworking with the application of a vacuum during operation of a welding arrangement to evacuate particulate matter, smoke, gas, and molten metal from a work area, the method for metalworking comprising:
   providing a welding arrangement with a welding head, an electrode holder retained by the welding head, an electrode retained by the electrode holder for creating a welding arc, and a welding power supply connected to the welding head;
   providing a vacuum system with a vacuum head and a vacuum nozzle retained by the vacuum head wherein the vacuum nozzle has a support surface for being rested on a surface of a workpiece during weld removal, cutting, and gouging;
   providing an adjustable mounting bracket wherein the mounting bracket couples the welding head to the vacuum head and is adjustable to permit an adjustment of a disposition of the welding head in relation to the vacuum head and an adjustment of a distance between the electrode of the welding head and the vacuum nozzle of the vacuum system;
   disposing the support surface of the vacuum nozzle on the surface of the workpiece to cause the workpiece and the vacuum nozzle to provide support to the vacuum head and the welding head with the welding head retained spaced above the surface of the workpiece;
   cutting, gouging, or removing welding from the workpiece by actuating the electrode of the welding arrangement while evacuating particulate matter, smoke, gas, and molten metal through the vacuum nozzle by actuating the vacuum system.

2. The method for metalworking of claim 1 further comprising the step of adjusting a height and supported position of the electrode above the surface of the workpiece by use of the adjustable mounting bracket.

3. The method for metalworking of claim 1 wherein the adjustable mounting bracket permits longitudinal and lateral adjustment of the welding head relative to the vacuum head.

4. The method for metalworking of claim 3 wherein the adjustable mounting bracket has a first portion coupled to the welding head and a second portion coupled to the vacuum head and establishes a pivotal coupling between the welding head and the vacuum head.

5. The method for metalworking of claim 4 wherein the adjustable mounting bracket has a relatively slidable coupling between the welding head and the vacuum head.

6. The method for metalworking system of claim 5 wherein the adjustable mounting bracket has a support ring that matingly receives a portion of the welding head and wherein the slidable coupling between the welding head and the vacuum head is formed by a channel in combination with a fastener slidably engaged with the channel.

7. The method for metalworking of claim 6 wherein the adjustable mounting bracket comprises the support ring, a means for fixing the support ring relative to the welding head, a ring bracket that projects from the support ring, a link pivotally coupled to the ring bracket by a clamping fastener that can selectively lock the ring bracket in relation to the link, a vacuum head bracket that projects from the vacuum head, a channel that communicates longitudinally along the link, and a clamping fastener that passes through the vacuum head bracket and through the channel.

8. The method for metalworking of claim 1 wherein the welding arrangement comprises a tungsten inert gas (TIG) welding arrangement with a nonconsumable tungsten electrode and an inert gas supply for providing shielding gas during metalworking.

9. The method for metalworking of claim 1 wherein at least a portion of the vacuum nozzle is formed from at least one material from the group consisting of sapphire gemstone and zirconium alloy.

10. The method for metalworking of claim 1 wherein the vacuum system further comprises a source of negative air pressure connected to the vacuum head by a conduit.

11. The method for metalworking of claim 10 further comprising a cooling and retention chamber interposed between the vacuum head and the source of negative air pressure wherein the cooling and retention chamber comprises a fluid-tight chamber for retaining a volume of cooling fluid, an inlet port connected to the vacuum head, an outlet port connected to the source of negative pressure, and at least one baffle between the inlet port and the outlet port.

12. The method for metalworking of claim 11 further comprising a vacuum control assembly coupled to the conduit wherein the vacuum control assembly comprises a pressure gauge and a control valve.

13. The method for metalworking of claim 12 wherein the source of negative air pressure, the cooling and retention chamber, and the vacuum control assembly are integrated into a portable unit.

14. The method for metalworking of claim 1 further comprising the step of adjusting the distance between the electrode of the welding head and the vacuum nozzle of the vacuum system thereby to adjust operation of the electrode and the vacuum head.

15. A method for metalworking with the application of a vacuum during operation of a welding arrangement to evacuate particulate matter, smoke, gas, and molten metal from a work area, the method for metalworking comprising:
providing a welding arrangement with a welding head, an electrode holder retained by the welding head, an electrode retained by the electrode holder for creating a welding arc, and a welding power supply connected to the welding head;
providing a vacuum system with a vacuum head and a vacuum nozzle retained by the vacuum head wherein the vacuum nozzle has a support surface for being rested on a surface of a workpiece during weld removal, cutting, and grouping;
providing an adjustable mounting bracket wherein the mounting bracket couples the welding head to the vacuum head and is adjustable to permit an adjustment of a disposition of the welding head in relation to the vacuum head and an adjustment of a distance between the electrode of the welding head and the vacuum nozzle of the vacuum system;
disposing the support surface of the vacuum nozzle on the surface of the workpiece to cause the workpiece and the vacuum nozzle to provide support to the vacuum head and the welding head with the welding head retained spaced above the surface of the workpiece;
cutting, gouging, or removing welding from the workpiece by actuating the electrode of the welding arrangement while evacuating particulate matter, smoke, gas, and molten metal through the vacuum nozzle by actuating the vacuum system;
wherein the vacuum nozzle has a tip with a base bevel surface disposed at an angle relative to a longitudinal axis of the vacuum nozzle that forms the support surface and a suction bevel surface disposed at an angle opposed to the angle of the base bevel surface whereby the suction bevel surface is upturned from the support surface.

16. The method for metalworking of claim 15 wherein the vacuum nozzle has a nozzle aperture with at least a portion of the nozzle aperture interposed along the suction bevel surface.

17. A method for metalworking with the application of a vacuum during operation of a welding arrangement for evacuating particulate matter, smoke, excess gas, and molten metal from a work area during the metalworking, the method comprising the steps of:
providing a tungsten inert gas (TIG) welding arrangement with a welding head, an electrode holder retained by the welding head, a nonconsumable tungsten electrode retained by the electrode holder for creating a welding arc, a welding power supply connected to the welding head, and an inert gas supply for providing shielding gas during a metalworking operation;
providing a vacuum system with a vacuum head and a vacuum nozzle retained by the vacuum head wherein the vacuum nozzle has a support surface for being rested on a surface of a workpiece during weld removal, cutting, and gouging;
providing an adjustable mounting bracket with a first portion for being secured to the vacuum head and a second portion for being secured to the welding head wherein the adjustable mounting bracket permits an adjustment of a disposition of the welding head in relation to the vacuum head and an adjustment of a distance between the electrode of the welding head and the vacuum nozzle of the vacuum system;
disposing the support surface of the vacuum nozzle on the surface of the workpiece to cause the workpiece and the vacuum nozzle to provide support to the vacuum head and the welding head with the welding head retained spaced above the surface of the workpiece;
cutting, gouging, or removing welding from the workpiece by actuating the electrode of the welding arrangement while evacuating particulate matter, smoke, gas, and molten metal through the vacuum nozzle by actuating the vacuum system.

18. The method for metalworking of claim 17 further comprising the step of adjusting the distance between the electrode of the welding head and the vacuum nozzle of the vacuum system thereby to adjust operation of the electrode and the vacuum head.

19. The method for metalworking of claim 17 wherein the adjustable mounting bracket permits longitudinal and lateral adjustment of the welding head relative to the vacuum head.

20. The method for metalworking of claim 19 wherein the adjustable mounting bracket establishes a pivotal coupling between the welding head and the vacuum head and a relatively slidable coupling between the welding head and the vacuum head.

21. The method for metalworking of claim 17 wherein the vacuum nozzle has a tip with a base bevel surface disposed at an angle relative to a longitudinal axis of the vacuum nozzle that forms the support surface and a suction bevel surface disposed at an angle opposed to the angle of the base bevel surface whereby the suction bevel surface is upturned from the support surface.

22. The method for metalworking of claim 21 wherein the vacuum nozzle has a nozzle aperture with at least a portion of the nozzle aperture interposed along the suction bevel surface.

* * * * *